INVENTORS
KEITH M. CHIRGWIN &
LAWRENCE J. STRATTON
BY
ATTORNEYS

INVENTORS
KEITH M. CHIRGWIN &
LAWRENCE J. STRATTON
BY
ATTORNEYS

Dec. 25, 1962 K. M. CHIRGWIN ETAL 3,070,740
CONSTANT FREQUENCY GENERATOR
Filed April 6, 1959 3 Sheets-Sheet 3

INVENTOR.
KEITH M. CHIRGWIN &
BY LAWRENCE J. STRATTON
ATTORNEYS

United States Patent Office 3,070,740
Patented Dec. 25, 1962

3,070,740
CONSTANT FREQUENCY GENERATOR
Keith M. Chirgwin, Bedford Heights, and Lawrence J. Stratton, Lyndhurst, Ohio, assignors, by mesne assignments, to Lear Siegler, Inc., a corporation of Delaware
Filed Apr. 6, 1959, Ser. No. 804,247
9 Claims. (Cl. 322—32)

This invention relates to alternating current generators and, more particularly, to machines for generating alternating current of substantially constant frequency regardless of comparatively wide variations in the speed of the shaft by which the machine is driven.

This application is a continuation-in-part of our co-pending application Serial No. 765,472, filed October 6, 1958, now Patent No. 2,995,696, issued August 8, 1961, in which a variable speed constant frequency generating system is disclosed and claimed. The present invention relates to machines embodying the generating system of our aforesaid co-pending application and particularly to variable speed constant frequency generators which, in a preferred form, require no brushes, slip rings, commutators or the like.

As explained in our co-pending application aforesaid, in machines of the induction type if the excited windings, which are ordinarily the rotor windings, are excited with D.C., the desired output frequency is produced at one particular shaft speed. This is referred to herein as "synchronous speed." At synchronous speed with D.C. excitation, the field rotates at the same speed as the rotor, i.e., the field and the rotor both rotate at synchronous speed and the field is stationary with respect to the exciting windings. If, however, the excitation is by polyphase alternating current, the field can be made to rotate with respect to the exciting windings carried by the rotor so that the field will rotate with respect to the stator at a speed either greater than the rotor speed or less than the rotor speed. By proper control of the excitation frequency and phase relationship, the field can be made to rotate with respect to the rotor at such a speed and direction that the field will rotate at the desired synchronous speed and the output will be of the desired frequency regardless of the shaft speed.

The direction of rotation of the field with respect to the rotor which is required when the rotor is driven below synchronous speed is called "positive" hereinafter, and the direction required when the rotor is driven above synchronous speed is called "negative" hereinafter. The frequency required to produce the desired rotation of the field with respect to the rotor is equal to the difference between shaft frequency and the desired output frequency and is hereinafter called "slip frequency." When the rotor is operating precisely at synchronous speed, the slip frequency is zero and the excitation is direct current; the term "slip frequency" as used herein includes this condition. When positive rotation of the rotor field is required, and also at synchronous speed of the rotor, excitation power must be supplied to the rotor from some external source. When negative rotation of the rotor field is required, power is generated in the rotor windings and must be absorbed externally of the rotor at speeds substantially in excess of synchronous; at speeds that are near synchronous, this power is absorbed in the losses of the rotor itself.

Our co-pending application aforesaid discloses a system operating in accordance with the above noted principles and comprising a main induction generator having a polyphase exciting winding, an exciter mounted on or driven by the same shaft as the main induction generator, a static frequency changer embodying controlled rectifiers connected between the exciter and the exciting windings of the main generator and a pulse generator for controlling the firing of the rectifying devices in the frequency changer to change the frequency of the output of the synchronous exciter to slip frequency with interchange of both real and reactive power in either direction between the synchronous exciter and the exciting windings. As appears more fully below, the machine of the present invention operates according to the same basic principles and the improvement consists in the arrangement of the basic components so as to provide a machine that is brushless at least insofar as the transmission of power is concerned and one that is brushless throughout in its preferred form.

In the drawings:

FIGURE 1 diagrammatically illustrates a preferred form of machine embodying our invention.

Figure 1:
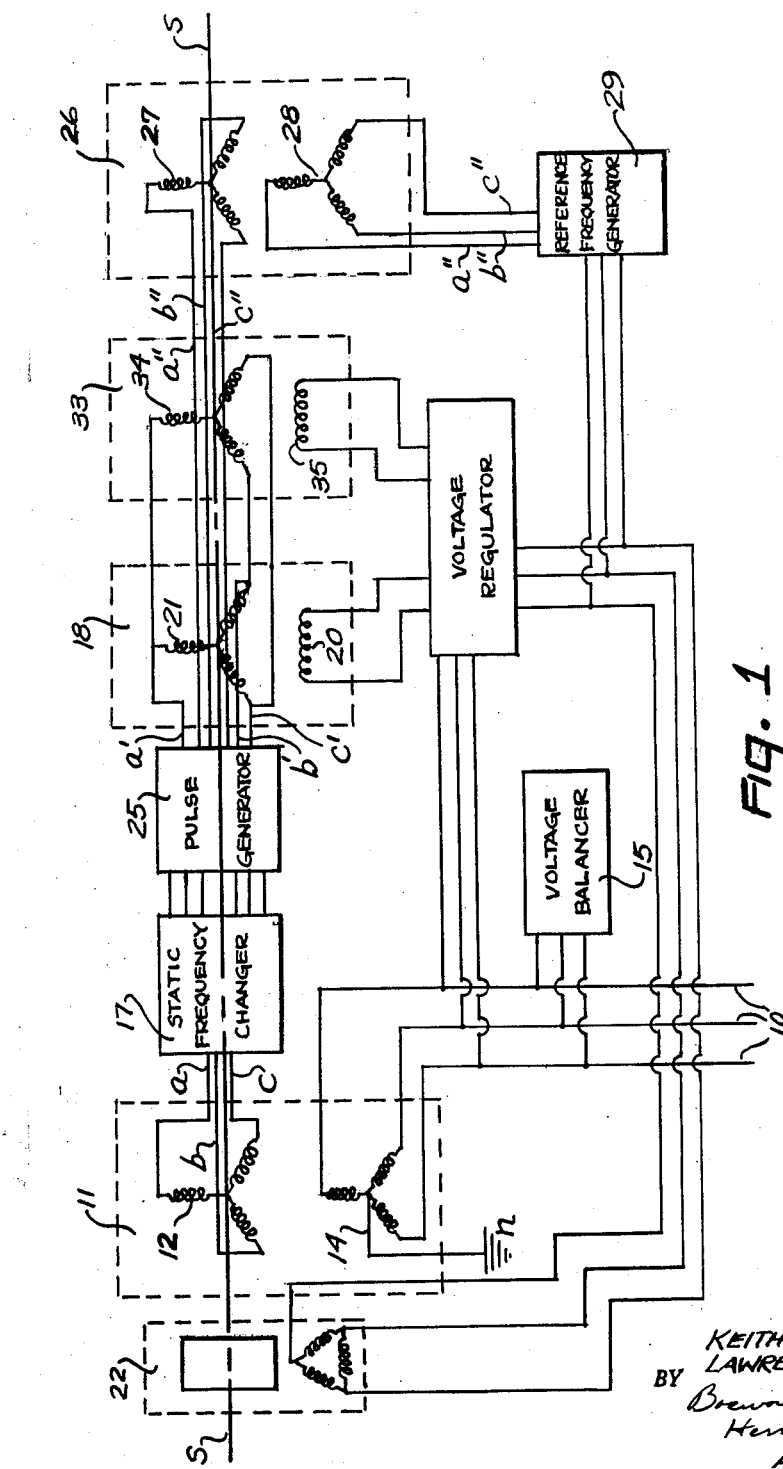

Referring to FIGURE 1 of the drawings, all of the rotating components of the machine are mounted on a shaft S which is arranged to be driven at variable speeds by a prime mover (not shown). The machine is designed to supply three phase alternating current of substantially constant frequency to the bus bars 10 regardless of rather wide variations in the speed of the shaft S. For example, the machine may be designed to generate 400 cycle A.C. within a frequency tolerance of plus or minus ¼ cycle per second throughout a shaft speed range of 4,500 r.p.m. to 9,000 r.p.m., synchronous speed being 6,000 r.p.m.

The main rotating machine of the system is an induction generator indicated in general at 11. This is a non-salient pole machine having three-phase rotating exciting windings 12 and three-phase stationary output windings 14 that are connected to the busses 10. As explained in our co-pending application, a synchronous condenser of voltage balancer 15 may be connected to the busses 10 to balance the voltages between the phases when the load is unbalanced, to smooth out the output wave, to improve the power factor of the induction generator 11 and to provide excitation therefor. The voltage balancer is a free running synchronous machine having a very heavy pole face amortisseur winding. This machine provides the system with a low negative sequence impedance and thus helps to maintain voltage balance under unbalanced load conditions. It can also be operated as a synchronous condenser to supply reactive kva. to the load.

Excitation current for the main generator 11 is supplied to the exciting windings 12 by means of a static frequency changer 17 which is also mounted on the shaft S and which is described below. The frequency changer rotates with the shaft; it is referred to herein as "static" because it is made up of static components. Depending upon the system requirements as determined by the speed of the shaft, the excitation current may be A.C. of such phase relationship that the field produced by the rotor 12 rotates at a greater speed than the shaft, may be D.C., or may be A.C. of such phase relationship that the rotor field rotates at a lesser speed than the shaft; in this latter case, the flow of power is from the rotor windings into the static frequency changer. The three phases of slip frequency supply from the static frequency changer to the rotor windings 12 are designated as $a$, $b$, and $c$.

The static frequency changer is connected to an exciter, indicated in general at 18, and having a stator 20 and rotor 21. In the present embodiment, this is a synchronous machine having the same number of poles as the main generator. If desired, D.C. excitation for the stator or field windings 20 of the exciter may be furnished for start up by a permanent magnetic generator 22 through a voltage regulator 23 embodying a static rectifier. The voltage regulator is also connected to the output busses 10, in order to sense the output voltage and also to provide excitation power if desired. The rotor windings 21 of the exciter are connected to a pulse generator 25 and to the static frequency changer 17. The pulse generator 25 is also mounted on the shaft S.

Figure 3:
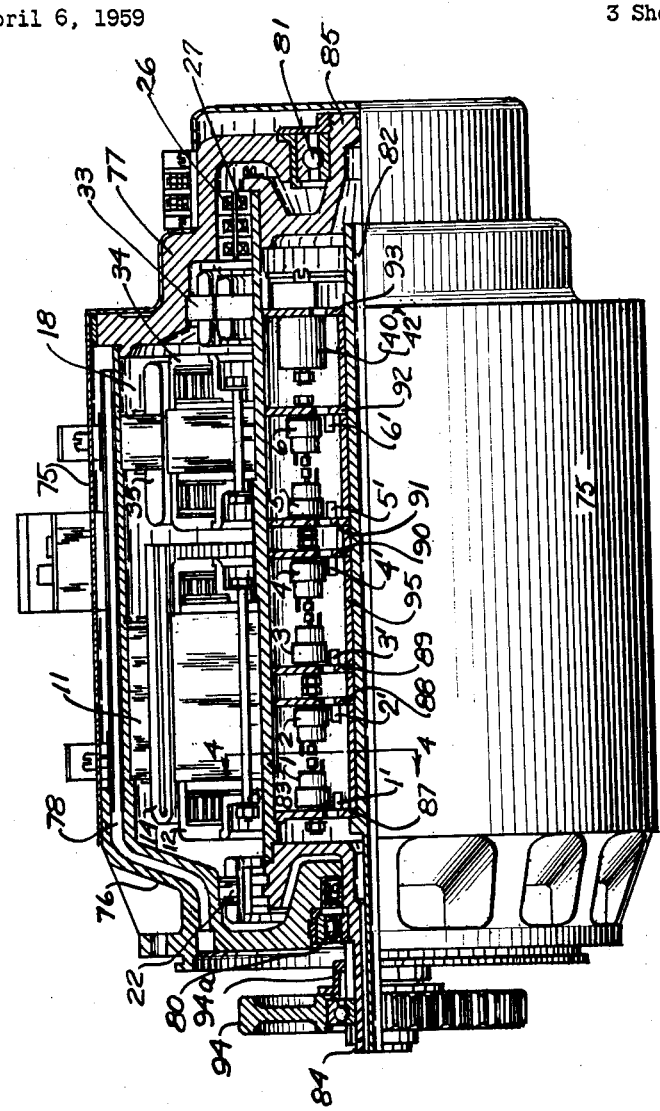
FIGURE 3 is a longitudinal view partially in section illustrating a practical embodiment of the machine shown in FIGURE 1.

As explained in our co-pending application and with particular reference to FIGURES 6 and 7 thereof, the pulse generator is controlled to provide firing pulses to the controlled rectifiers in the frequency changer by signals derived from the shaft frequency output of the exciter 18 and from a constant reference frequency signal having a frequency equal to the desired output frequency of the main generator. The reference frequency is supplied to the pulse generator without the use of brushes or slip rings by means of a small rotating transformer 26 having a three phase rotor or secondary winding 27 mounted on shaft S, and a three phase stator or primary 28 which is energized by the reference frequency generator 29. The reference frequency generator 29 may be energized by the permanent magnet generator 22 and may be of any conventional construction such as a tuning fork controlled oscillator and has a three phase output of the desired frequency, which is 400 cycles in the present example. The reference frequency phases are indicated at $a''$, $b''$ and $c''$. Since the windings of transformer 26, which is of known construction, extend circumferentially around the shaft as indicated in FIGURE 3, relative rotation between the rotor windings 27 and the stator or primary windings 28 does not affect the frequency. Thus, the output of the secondary is at the reference frequency. The reference frequency signal is transmitted from the rotating transformer 26 to the pulse generator 25 by conductors extending along the shaft as indicated at $a''$, $b''$ and $c''$.

Some types of voltage regulating systems require a signal that is proportional to the exciter voltage. If such a signal is required, a small induction machine 33 is also mounted on the shaft S. This machine has a three-phase wound rotor 34 that is connected directly to the three phase output terminals of the synchronous exciter rotor 21 with a phase rotation opposite to that of the exciter. The machine also has a single phase stator winding 35. The rotating field that is set up in the air gap of this machine generates an E.M.F. in the stator winding whose frequency $(f_s)$ is given by $$f_s = \frac{P_1 + Pex}{Pex} fex$$

where $f_s$ is the frequency of the E.M.F. in the signal machine 33
$fex$ is the frequency of the E.M.F. in the exciter rotor 21
$P_1$ is the number of pole pairs of machine 33
$Pex$ is the number of pole pairs of the exciter 18.

Since the frequency of the exciter varies directly with the speed of rotation of the shaft, the frequency $(f_s)$ in the signal machine stator also varies directly with the shaft speed. The magnitude of the E.M.F. in the signal machine stator is directly proportional to the product of the frequency $(f_s)$ and the magnitude of the voltage at the rotor terminal of the synchronous exciter. By feeding the output from the stator 34 to a circuit in the voltage regulator that is largely reactive, a current is obtained which is independent of the frequency $(f_s)$ and which is therefore directly proportional to the magnitude of the voltage at the rotor terminals of the synchronous exciter no matter what the speed of rotation of the shaft may be. Thus, when a voltage regulating system is employed that requires a current proportional to exciter voltage, such current may also be obtained without requiring any brushes.

The voltage regulator 23 may be of any conventional or suitable type and forms no part of the present invention. It is to be noted that the voltage regulator may be supplied with power directly from the output of the main alternator as shown, as well as by the permanent magnet generator 22.

From the foregoing, it will be evident that the present invention provides a machine embodying the system of our prior aforesaid application in which no brushes, slip rings or commutators are required. The field windings of the permanent magnet generator 22 are stationary and are connected directly to the voltage regulator 23. The voltage regulator also receives energy from the main output bus bars 10 and supplies excitation to the stator 20 of the exciter 18. The rotor 21 of the exciter 18 is connected, by conductors carried by the shaft, to the pulse generator 25 and the static frequency changer 17, both of these elements being mounted on the shaft. Slip frequency excitation is supplied by the static frequency changer to the rotor 12 of the main generator through conductors carried by the shaft. The output windings 14 of the main generator are stationary so that no slip rings are required between the output windings and the bus bars 10.

The reference frequency is supplied to the pulse generator by means of the rotating transformer 26 and conductors carried by the shaft, and a signal from the terminals of the exciter rotor 21 is supplied to the voltage regulator by means of the induction machine 33. Thus, the entire machine operates without brushes, slip rings, commutators or the like. No effort has been made to show in FIGURE 1 all of the conductors that are carried by the shaft and extend between the exciter rotor 21, the frequency changer 17 and the pulse generator 25; these are shown in the circuit diagram constituting FIGURE 2.

Figure 2:
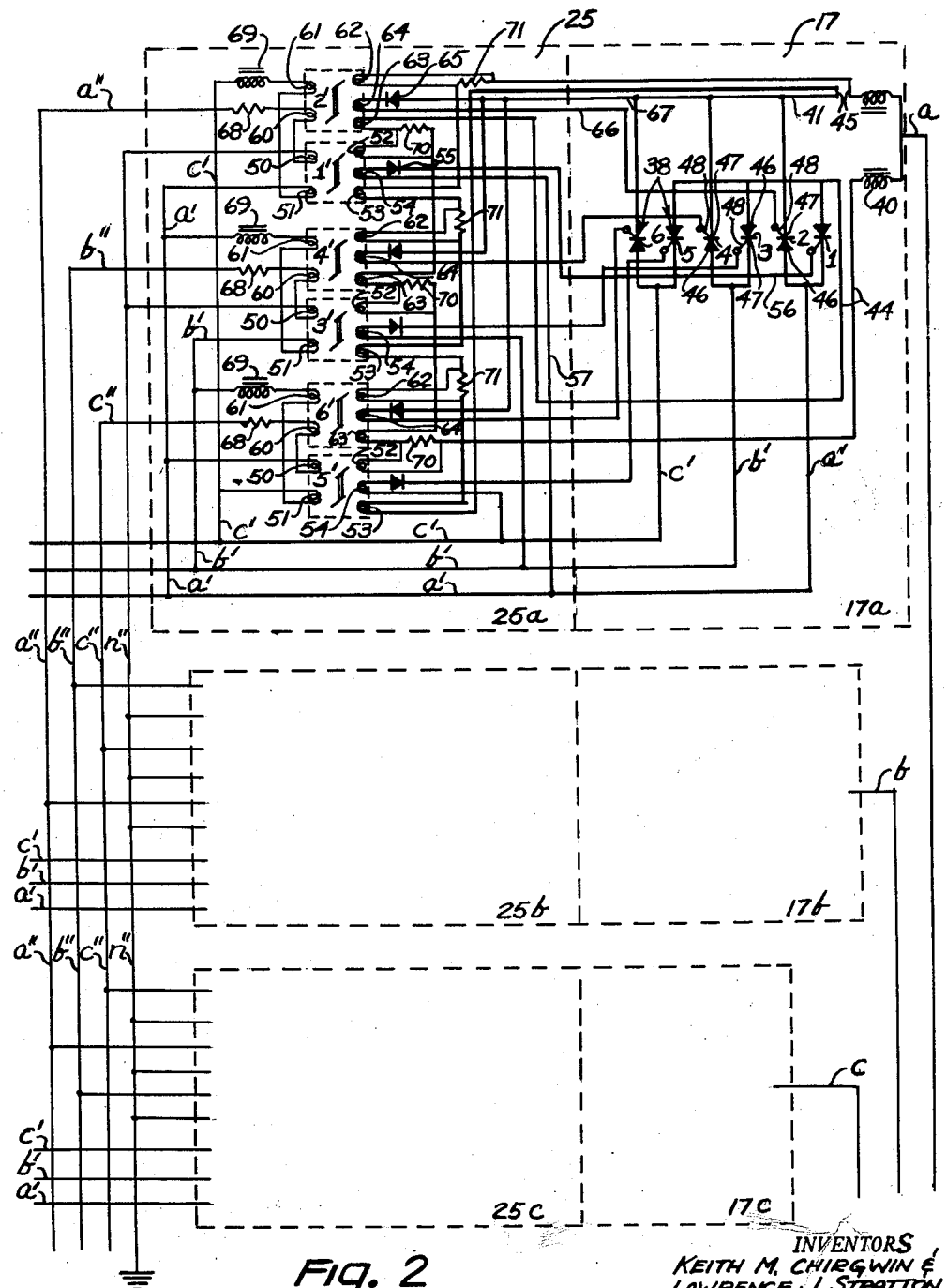
FIGURE 2 is a wiring diagram illustrating a preferred form of frequency changer and pulse generator for use in the machine.

As shown in FIGURE 2, the static frequency changer 17 is identical with the one disclosed in FIGURE 7 of our aforesaid application and is made up of three sections 17a, 17b and 17c, for phases a, b and c, respectively, of the slip frequency supply. The sections are identical in all material respects; for this reason only section 17a is described and shown in detail herein. Section 17a preferably comprises six substantially identical controlled silicon rectifiers 38; the individual rectifiers are identified by numerals 1, 2, 3, 4, 5 and 6. The rectifiers are connected in pairs, one pair for each phase of the high frequency supply, with the rectifiers in each pair connected back to back; i.e., arranged for conduction in opposite directions. Rectifiers 1 and 2 are connected to phase $a'$, rectifiers 3 and 4 are connected to phase $b'$, and rectifiers 5 and 6 are connected to the phase $c'$ of the line to the rotor 21 of exciter 18. The even numbered rectifiers are referred to hereinafter as "positive" rectifiers because they conduct when the slip frequency current is positive while, conversely, the odd numbered rectifiers are referred to as "negative" rectifiers. The negative rectifiers 1, 3 and 5 are connected to conductor 39 and through a choke 40 to phase a of the slip frequency supply leads to the rotating field 12 of generator 11. The positive rectifiers 2, 4 and 6 are connected to line 41 and through choke 42 to the same phase. Chokes 40 and 42 are shown as separate elements, but in effect, they constitute a center tapped choke. Conductors 44 in the negative rectifier lead and conductors 45 in the positive rectifier lead extend to the pulse generator 25. The connections to the pulse generator are series connections which are explained below.

In the arrangement shown, there are six controlled rectifiers for each of the three phases of the generator slip frequency supply. It is, therefore, a half wave device; the chokes 40 and 42 smooth the somewhat jagged wave form that is produced. The controlled silicon rectifiers are PNPN semi-conductors each having an anode 46, a cathode 47 and a gate 48. The rectifiers are normally non-conducting. Avalanche breakdown of the center junction is achieved by applying a signal to the gate, a very brief current pulse of 10 milliamperes at 1½ volts gate-to-cathode being sufficient. The amplitude of the current pulses is not critical, so long as it is sufficient to fire the rectifiers. Breakdown occurs at speeds that are almost instantaneous; after breakdown, the voltage across the rectifiers is very low. An extremely small amount of power applied at the gate makes it possible to control the switching action of the rectifiers at a very high rate of speed. When a rectifier is fired by applying appropriate current to the gate, the rectifier becomes conductive and continues until the forward voltage is removed; in this respect, the device acts much in the manner of a thyratron. It can be made conductive during any part of the positive half cycle of the anode to cathode voltage and will remain conductive throughout the remainder of the positive half cycle or until it is turned off as a result of the firing of another rectifier in the frequency changer. Thus, by applying appropriate signal currents at the correct times to the gates 48 of each of the controlled rectifiers, the static frequency changer can be caused to convert the high frequency current supplied by the exciter to the slip frequency current required by the generator with transfer of power in either direction and at any power factor.

The required signal currents are supplied in the form of pulses by the pulse generator 25. The pulse generator is composed of three sections 25a 25b, and 25c associated with sections 17a, 17b and 17c, respectively, of the frequency changer. Only section 25a is illustrated in detail inasmuch as the other sections are substantially identical. As described in our aforesaid copending application, signal pulses are supplied to the gates 48 of the several controlled rectifiers at the correct instants required by the demands of the apparatus by means of magnetic core devices 1', 2', 3', 4', 5' and 6' which control the firing of rectifiers 1, 2, 3, 4, 5 and 6, respectively. Each magnetic core device preferably takes the form of a saturable pulse transformer having a toroidal core of square loop material, and the devices are arranged in pairs corresponding to the arrangement of the pairs of rectifiers in the static frequency changer. The magnetic core devices are substantially identical, but receive input signals from different phases (a', b' and c') of the exciter rotor 21 and of the reference frequency generator (a'', b'' and c''). The core devices 1' and 2' for controlling the rectifiers 1 and 2 are described in detail herein, and the same reference characters are applied to corresponding parts of cores 3' and 5', and 4' and 6', respectively.

Each core is provided with five windings. On core 1, these are input windings 50, 51, 52 and 53 and output winding 54. On core 2, the input windings are indicated at 60, 61, 62 and 63 and the output winding at 64. The devices are constructed so that the cores are in a state of either negative saturation or positive saturation except when the algebraic sum of the ampere turns in the several input windings is substantially equal to zero. An output pulse is generated in an output winding only when the associated core goes from one state of saturation to the opposite state of saturation. If necessary, a rectifier 55 can be inserted in the output circuit from winding 54 and a rectifier 65 in the corresponding circuit from winding 64 to permit current to flow only when the cores go from negative saturation to positive saturation. This takes place very rapidly so that the firing of the controlled rectifiers by the resultant pulses can be accurately timed. The cores are saturated except for very brief intervals as they pass through zero, the amplitude of the firing pulses is not critical so long as sufficient current is supplied; therefore, accurate control of the firing time does not depend upon control of the degree of saturation of the cores and it is not necessary to match the cores or the windings with any great degree of accuracy. The output of winding 54 on core 1' is connected to the gate-cathode circuit of rectifier 1 by conductors 56 and 57 as shown and the output of winding 64 on core 2' is connected to the gate-cathode circuit of rectifier 2 by conductors 66 and 67 as shown. The outputs of the windings 54 on cores 3' and 5' are connected to the gate-cathode circuits of rectifiers 3 and 5, respectively; the outputs of the windings 64 on cores 4' and 6' are connected to the gate-cathode circuits of rectifiers 4 and 6, respectively.

The instants at which rectifiers 1 and 2 are fired are determined primarily by the inputs to the windings 50 and 51 of cores 1' and 60 and 61 of core 2'. Windings 50 and 60 on cores 1' and 2' in section 25a of the pulse generator are connected in series and are supplied by phase a'' of the reference frequency source; windings 50 and 60 of cores 3' and 4' are supplied by phase b''; and windings 50 and 60 on cores 5' and 6' are supplied by phase c'' of the reference frequency source. Resistances 68 are included in these circuits to provide stable current sources. Windings 51 and 61 on cores 1 and 2 are also connected in series and are connected across phases a' and c' of the exciter 18. A choke 69 is incorporated in this circuit. This circuit provides a current through windings 51 and 61 that lags approximately 120° behind the voltage of phase a' which is supplied to rectifiers 1 and 2. The inductance 69 provides a 90° lag, and the additional 30° is obtained by the connection across phases a' and c' as compared to the a' to neutral voltage applied to the rectifiers 1 and 2. It would be possible to use another high frequency phase and eliminate the inductance, but the inductance is desirable in order to provide a constant current source and to minimize the effects of firing the cores on the high frequency supply circuit. Similar circuits are provided for connecting coils 51 and 61 on cores 3' and 4' across phases a' and b' of the high frequency supply and coils 51 and 61 on cores 5' and 6' across phases b' and c' of the high frequency supply. These circuits also include inductances 69 and provide currents that lag phases b' and c', respectively, by 120°. It is to be noted that the input windings on the even numbered cores and the input windings on the odd numbered cores are connected so that the cores in a pair fire 180° apart.

Windings 53 and 63 are provided on the cores to prevent any of the rectifiers of one group from conducting at the same time that any of the rectifiers of the other group are conducting any substantial amount of current. When any rectifier in the positive group is conducting, the windings 53 on cores 1', 3' and 4', which are all connected in series with the output of the positive rectifiers 2, 4 and 6 through conductors 45, are energized, saturating the cores and preventing the generation of a signal pulse in the windings 54. Similarly, when any of the negative rectifiers 1, 3 and 5 are conducting, the windings 63 on cores 2, 4 and 6 are energized through conductors 44, holding all of these cores in saturation and preventing firing of rectifiers 2, 4 and 6. It is to be noted that these signals are determined by the current flow. This is important because in normal operation of the apparatus, the output current and voltage are not in phase because of the reactive nature of the load.

Windings 52 and 62 on cores 1', 3' and 5' and cores 2', 4' and 6', respectively, are connected across shunts 70 and 71 in the current feedback circuits 44 and 45, respectively. These windings slightly shift the zero axis of the cores and thereby shift the firing points of the cores with which they are associated. For example, when the negative group of controlled rectifiers 1, 3 and 5 are conducting, the current passed by the negative group develops voltages across the shunts 70; this supplies currents to the windings 52 on the cores 1', 2' and 3'. These additional ampere turns slightly advance the firing points of the cores in order to compensate for commutating overlap which varies approximately directly with the current. The windings 62 on cores 2', 4' and 6', connected across shunts 71, provides corresponding compensation for the positive group of controlled rectifiers. These windings do not appear to be essential to satisfactory operation, but are desirable.

In sections 25b and 25c of the pulse generator, the relationship between the phases is changed in order to provide phases b and c of the slip frequency supply. Thus, in sections 25b and 25c, the shaft frequency (i.e. exciter 18 frequency) supply to the several cores, as diagrammatically indicated, is the same as in section 25a, but in section 25b windings 50 and 60 on cores 1' and 2' are supplied by phase b" of the reference frequency; windings 50 and 60 on cores 3' and 4' are supplied by phase c" of the reference frequency; and windings 50 and 60 on cores 5' and 6' are supplied with phase a" of the reference frequency. In section 25c, windings 50 and 60 on on cores 1' and 2' are supplied by phase c", windings 50 and 60 on cores 3' and 4' are supplied by phase a"; and windings 50 and 60 on cores 5' and 6' are supplied by phase b" of the reference frequency. This provides the proper phase relationship in the slip frequency supply phases, a, b and c. As explained in greater detail in our aforesaid co-pending application, this arrangement provides a frequency changer embodying compact and reliable static components and one which is able to transmit both real and reactive power in either direction. As those skilled in the art understand, when the generator 11 is driven above synchronous speed, power is transmitted through the frequency changer to the exciter 18 which then operates as a motor and returns power to the shaft.

Figure 4:
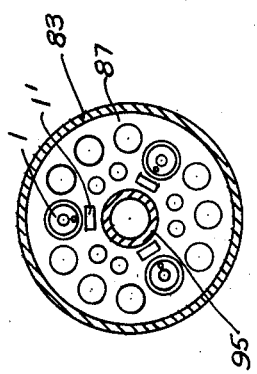
FIGURE 4 is a transverse section taken as indicated on line 4—4 of FIGURE 3.

A practical embodiment of a machine made according to our invention is illustrated in FIGURES 3 and 4 of the drawings. These figures show the manner in which the invention may be adapted to a compact 400 cycle generator useful, for example, in aircraft. The generator comprises a frame of generally conventional construction having a central portion 75 and end portions 76 and 77. The frame is provided with appropriate passageways for a coolant such as oil, the passages being shown at 78. End members 76 and 77 carry appropriate anti-friction bearings 80 and 81 that rotatably support the built-up shaft indicated in general at 82.

The shaft 82 is of novel construction inasmuch as it supports not only the rotating magnetic elements of the machine but also the frequency changer and pulse generator for controlling the slip frequency supply to the excited rotor windings of the main generator. To this end, the shaft 82 comprises an outer sleeve member 83, which is carried by end members 84 and 85 that are supported by the bearings 80 and 81. Outer sleeve 83 carries within it a series of annular discs 87, 88, 89, 90, 91, 92 and 93. The inner peripheries of the discs support an inner or hollow shaft or tube 95. The shaft may be driven through any convenient means such as the gear 94 and shear coupling 94a which is keyed to the end member 84. The gear 94 may be driven from a prime mover in any convenient manner. Cooling oil is circulated in conventional fashion through the inner tube 82 and the space between the inner tube 82 and the outer sleeve 83, the annular discs 87 to 93 being perforated, as shown, to permit axial flow of the cooling oil in the annular space between the tube and the sleeve.

The outer sleeve 83 carries the rotor 12 of the main generator and the stator 14 of the main generator is mounted in the frame in the usual manner. The stator may be of conventional construction. The rotor has a uniformly slotted cylindrical laminated core carrying, for example, an eight pole, three phase winding for a 60 kva., 400 cycle machine having a synchronous speed of 6,000 r.p.m.

The exciter is mounted next to the main generator and, as shown, the D.C. stator or exciting windings 35 are carried in the frame with appropriate core structure while the rotor 21, which has a three phase, eight pole wye winding in the illustrated embodiment, is mounted on the sleeve 83.

The permanent magnetic generator 22 is carried at the end of the machine adjacent to the main generator 12 while the small tachometer machine 33 is carried in the end member 77 at the opposite end of the machine. The field coil 35 of the tachometer is mounted in the frame while the rotor 37 is carried on the sleeve 83. The rotary transformer 26 is at the end of the sleeve 83. The rotor 27 is made up of three coils wound circumferentially of the generator shaft while the stator 28 is made up of three similar coils facing the respective rotor coils. The core structures of this induction machine are made up of segmental U-shaped laminations in known manner so that the laminations extend generally parallel to the circumferentially extending windings.

The static frequency changer 17, the pulse generator 25 and associated circuit components are disposed in the space between the inner tubular member 95 and the outer sleeve 83 with the components mounted on the radial extending annular members 87 to 93. The controlled rectifiers 1, 2, 3, 4, 5 and 6 for section 17a of the frequency changer are shown as being mounted on annular members 87, 88, 89, 90, 91 and 92, respectively, in FIGURE 3. Also as shown in that figure, the saturable pulse transformers 1', 2', 3', 4', 5', and 6' for each rectifier are mounted directly adjacent their respective rectifiers on the annular members. As shown in FIGURE 4, the controlled rectifiers and firing transformers for sections 17b and 25b and 17c and 25c of the frequency changer and pulse generator are similarly mounted, being uniformly spaced circumferentially on the radial members. The radial member 93 carries the chokes 40 and 42 for the three sections of the frequency changer.

The connections from the rotor of the rotary transformer 26 to the pulse generator, the connections between the exciter rotor 21 and the rotor 34 of the tachometer 33, the connections between the rotor 21 of the exciter 18 and the pulse generator and frequency changer and the connections between the frequency changer and the rotor 12 of the main generator are all carried by the rotating shaft assembly. All of the remaining connections are between stationary parts of the machine shown in FIGURE 3 and stationary external elements; the output windings 11 of the main generator are stationary and the reference frequency generator 29 and the voltage regulator 23 are also stationary and disposed in any convenient locations exteriorly of the frame 75 of the machine. Thus, the entire apparatus is entirely without brushes, slip rings, commutators, or the like and hence is suitable for service under severe operating conditions such as in aircraft.

Those skilled in the art will understand that various changes and modifications can be made in the preferred form of the invention described herein without departing from the spirit and scope of the invention. For example, a system such as disclosed in FIGURES 1 and 2 of our co-pending application may be employed if desired; in some systems, the permanent magnet generator may not be required; with some types of voltage regulators, the tachometer 33 will not be necessary; different types of induction devices may be employed to carry the signal derived from the constant frequency source across an air gap and onto the shaft, and for some services it may be permissible to employ brushes and slip rings to carry the signal voltages eliminating the need for either or both of the small induction machines 26 and 33. The mechanical design of the machine also may be changed to meet varying requirements. Other changes will undoubtedly occur to those skilled in the art. It is, therefore, to be understood that the foregoing description of a preferred form of the invention is given by way of example, and

We claim:

1. A machine for generating alternating current of substantially constant frequency at varying shaft speeds comprising a shaft adapted to be driven at varying speeds, a main induction generator having a rotor mounted on said shaft and a stator, said rotor having polyphase exciting windings and said stator having output windings, a synchronous exciter mounted on said shaft, said exciter having a stator having exciting windings and a rotor mounted on said shaft and having polyphase output windings, a static frequency changer connected between said exciter and said exciting windings of said main generator, said frequency changer comprising a plurality of solid state electronic switching and rectifying devices mounted on said shaft and a pulse generator comprising a saturating pulse transformer for each switching and rectifying device also mounted on said shaft, said pulse generator controlling the firing of said rectifiers to change the frequency of the output of said synchronous exciter to slip frequency with interchange of both real and reactive power in either direction between said synchronous exciter and said exciting windings of said main generator.

2. A machine for generating alternating current of substantially constant frequency at varying shaft speeds comprising a shaft adapted to be driven at varying speeds, a main induction generator having a rotor mounted on said shaft and a stator, said rotor having polyphase exciting windings and said stator having output windings, a synchronous exciter mounted on said shaft, said exciter having a stator having exciting windings and a rotor mounted on said shaft and having polyphase output windings, a static frequency changer connected between said exciter and said exciting windings of said main generator, said frequency changer comprising a plurality of solid state current controlled electronic switching and rectifying devices mounted on said shaft and a pulse generator comprising a saturating pulse transformer for each switching and rectifying device also mounted on said shaft, each transformer having an input winding carrying a current derived from the output of said synchronous exciter and an input winding carrying a current derived from a constant frequency source, and an output winding for supplying a firing pulse to one of said switching devices, said pulse generator controlling the firing of said rectifiers to change the frequency of the output of said synchronous exciter to slip frequency with interchange of both real and reactive power in either direction between said synchronous exciter and said exciting windings of said main generator.

3. A machine according to claim 2 wherein the electronic switching and rectifying devices take the form of pairs of silicon controlled rectifiers with the rectifiers in a pair arranged back to back.

4. A machine for generating alternating current of substantial constant frequency at varying shaft speeds, said machine comprising a main induction generator having a stator having output windings and a rotor having exciting windings, a main exciter having a stator having exciting windings and a rotor having output windings, a shaft comprising an outer sleeve member, said rotors being mounted on said sleeve member, a static frequency changer mounted within said sleeve and adapted to convert the output of the rotor of said exciter to slip frequency and supply such frequency to the rotor of said main generator.

5. A machine for generating alternating current of substantial constant frequency at varying shaft speeds, said machine comprising a main induction generator having a stator having output windings and a rotor having exciting windings, a main exciter having a stator having exciting windings and a rotor having output windings, a shaft comprising an outer sleeve member and an inner tubular member with an annular space between them, said rotors being mounted on said sleeve member, a static frequency changer mounted in said annular space and adapted to convert the output of the rotor of said exciter to slip frequency and supply such slip frequency to the rotor of said main generator.

6. A machine for generating alternating current of substantial constant frequency at varying shaft speeds, said machine comprising a main induction generator having a stator having output windings and a rotor having exciting windings, a main exciter having a stator having exciting windings and a rotor having output windings, a shaft comprising an outer sleeve member and an inner tubular member with an annular space between them, said rotors being mounted on said sleeve shaft, a static frequency changer and a pulse generator for controlling said frequency changer mounted in said annular space, said frequency changer being adapted to convert the output of the rotor of said exciter to slip frequency and supply such slip frequency to the rotor of said main generator.

7. A machine according to claim 6 wherein said static frequency changer comprises a plurality of controlled rectifiers and wherein said pulse generator comprises a saturable pulse transformer for controlling the firing of each rectifier.

8. A machine for generating alternating current of substantially constant frequency at varying shaft speeds, said machine comprising a main induction generator having a stator having output windings and a rotor having exciting windings, a main exciter having a stator having exciting windings and a rotor having output windings, a permanent magnet auxiliary exciter having a permanent magnet rotor and a stator having output windings, a rotating transformer having a rotor and a stator, all of said rotors being mounted on a common shaft, a static frequency changer mounted on said shaft and adapted to convert the output of the rotor of said exciter to slip frequency and supply such slip frequency to the rotor of said main generator, connections between the rotor of said rotating transformer and said frequency changer, stationary means for supplying a control signal to the stator of said rotating transformer, said machine having a frame and the stators of said main generator, said exciter, and said rotating transformer all being mounted in said frame, stationary means for producing a signal for controlling said frequency changer and connections between said stationary means and the rotor of said rotating transformer, a stationary voltage regulator having a static rectifier and connections between said voltage regulator and the stator of said main exciter and the stator of said permanent magnet generator.

9. A machine for generating alternating current of substantially constant frequency at varying shaft speeds, said machine comprising a main induction generator having a stator having output windings and a rotor having exciting windings, a main exciter having a stator having exciting windings and a rotor having output windings, a permanent magnet auxiliary exciter having a permanent magnet rotor and a stator having output windings, a tachometer generator having a rotor and a stator, a rotating transformer having a rotor and a stator, all of said rotors being mounted on a common shaft, a static frequency changer mounted on said shaft and adapted to convert the output of the rotor of said exciter to slip frequency and supply such slip frequency to the rotor of said main generator, connections between the rotor of said rotating transformer and said frequency changer, stationary means for supplying a control signal to the stator of said rotating transformer, said machine having a frame and the stators of said main generator, said exciter, said permanent magnet exciter and said rotating transformer all being mounted in said frame, a stationary oscillator for producing a constant frequency signal voltage for controlling said frequency changer and connections between said oscillator and the stator of said rotating transformer, a stationary voltage regulator and connections between said voltage regulator and the stator of said permanent magnet generator, the stator of said main exciter and the stator of said tachometer, and connections on said shaft between said tachometer and the rotor windings of said main exciter.

References Cited in the file of this patent
UNITED STATES PATENTS

| | | |
|---|---|---|
| 2,204,916 | Shotter | June 18, 1940 |
| 2,659,044 | MacNeil | Nov. 10, 1953 |
| 2,854,617 | Johnson | Sept. 30, 1958 |
| 2,886,766 | Gibson | May 12, 1959 |

UNITED STATES PATENT OFFICE
CERTIFICATE OF CORRECTION

Patent No. 3,070,740                 December 25, 1962

Keith M. Chirgwin et al.

It is hereby certified that error appears in the above numbered patent requiring correction and that the said Letters Patent should read as corrected below.

Column 6, line 51, for "4'" read -- 5' --; line 57, for "2, 4 and 6" read -- 2', 4' and 6' --.

Signed and sealed this 22nd day of October 1963.

(SEAL)
Attest:

ERNEST W. SWIDER
Attesting Officer

EDWIN L. REYNOLDS

Acting Commissioner of Patents